Aug. 20, 1968  F. H. FERRIS  3,398,327
LAMINATED BUS STRUCTURE AND TERMINAL ASSEMBLY
Filed Oct. 24, 1966  2 Sheets-Sheet 2
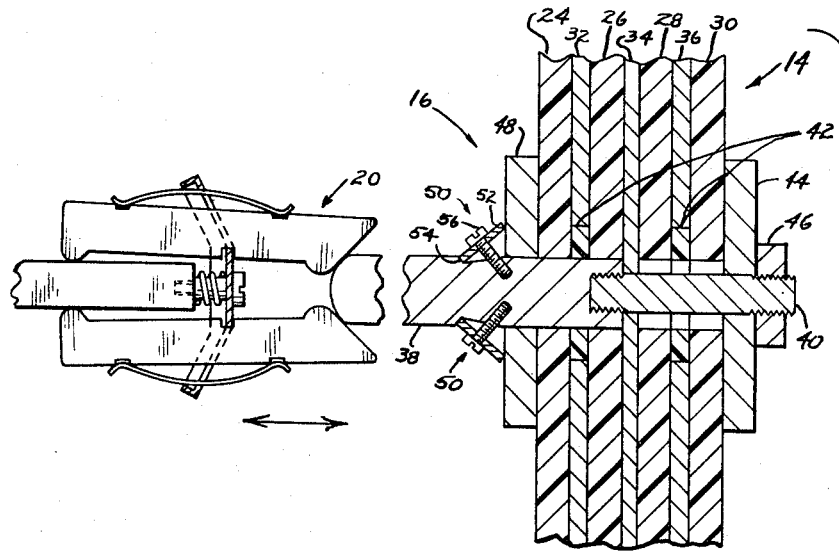
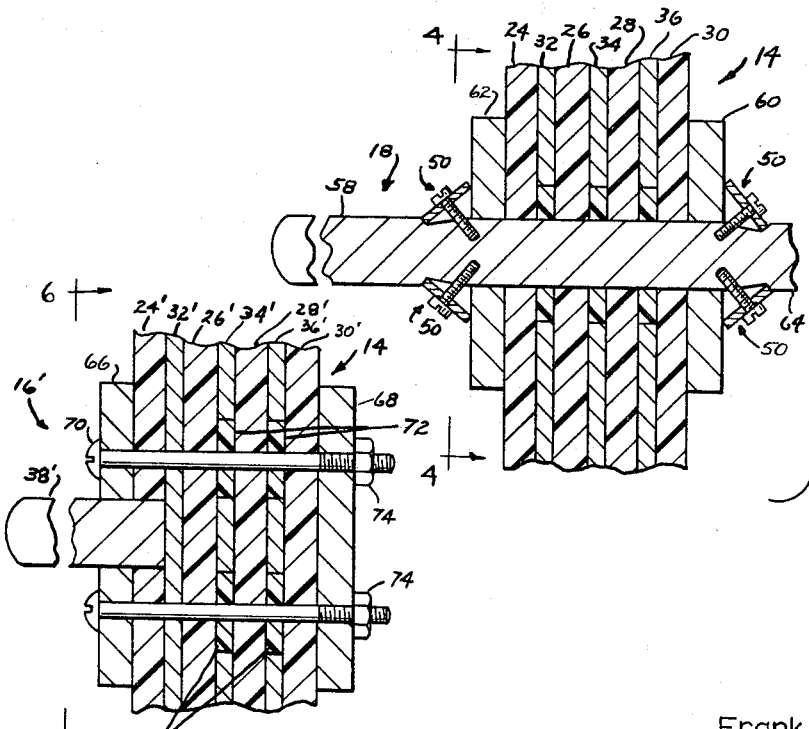
INVENTOR.
Frank H. Ferris
BY
Attorney

United States Patent Office 3,398,327
Patented Aug. 20, 1968

3,398,327
LAMINATED BUS STRUCTURE AND TERMINAL ASSEMBLY
Frank H. Ferris, Toronto, Ontario, Canada, assignor to Federal Pacific Electric Company, a corporation of Delaware
Filed Oct. 24, 1966, Ser. No. 588,903
18 Claims. (Cl. 317—103)

ABSTRACT OF THE DISCLOSURE

A laminated bus structure comprising interleaved sheets of insulation and conductor material is provided with terminal elements capable of receiving plug-in contact stresses without the delamination of the bus structure.

This invention relates to electrical distribution apparatus and more particularly to switchgear apparatus employing a laminated bus assembly.

A recent advance in the art of electrical distribution apparatus has been the development of a laminated bus assembly such as that described in British Patent No. 1,030,283. The laminated bus assembly comprises a plurality of interleaved sheets of insulation and layers of conductor material which are bonded together. Connection terminals are provided to the conductor layers within the laminated bus by terminals which are secured, in the case of the line terminals, to respective ones of the plural layers of conductor material. The line terminals extend through the intervening sheets of insulation and layers of conductor material to the exterior of the laminated bus for connection to a circuit controlling device such as a circuit breaker or switch. Load terminals which complete the circuit from the controlling device to the connected load pass through the entire bus without electrical connection thereto. Laminated bus structures have been found to have particular advantages in the distribution of relatively high levels of current when employed in switchgear. In such uses the single laminated bus assembly provides multiple takeoff points in a vertical section of the switchgear where the circuit breakers are stacked one above the other in separate chambers in the section. When high currents, of the order of 3000 amperes, are carried the bus structure must be capable of handling much higher short circuit currents. Typically, the bus design requires a "withstand ability" of 100,000 amperes. The term "withstand ability" may be defined as the capability of the bus structure to withstand the electrodynamic forces generated by high currents. The electrodynamic stresses have been overcome in the prior art bus structures by means of large cross section bus bars supported on massive discrete insulators. In the laminated bus structure herein contemplated the insulating sheets and layers of conductors are adhesively bonded together and it is, to a large measure, upon this bond that the withstand ability of the structure depends. Therefore, the preservation of the bond or solidity of the bus assembly becomes extremely important.

In the prior art the connection stresses, that is the stresses placed upon the bus conductors when a takeoff or switching device was forcefully connected thereto, were accommodated by the insulator support structures without deleterious effect. In the present construction, wherein the terminals are directly secured to respective ones of the interior conductor sheets, such stresses must be prevented from causing delamination of the bonded bus structure. It is an object of this invention to inhibit the delamination of the bus by stresses applied to the laminated bus structure.

It is still another object of this invention to provide mechanical protection to the connection between the terminals and the conductor layers in a laminated bus structure during the operations of connecting and disconnecting a takeoff device to the structure.

Still another object of this invention is to provide an improvement in mounting means for a load terminal arrangement used with laminated bus structures.

In carrying out the invention in one preferred form, drawout switchgear is provided including a vertical section having one or more chambers and a mobile switching device having registering terminal elements for insertion in one of the chambers. The back wall of the section includes a laminated bus assembly which comprises a plurality of interleaved sheets of insulation and sheets or layers of conductive material bonded together into a laminated stack. The bus structure has line terminals which are mechanically and electrically connected to respective ones of the layers of conductor material in the bus for connection with the line terminals of the mobile switching device. The bus structure is also provided with load terminals for connection with the load terminals of the switching device. Means are provided which fix the bus terminal elements in place relative to the laminated bus assembly so that delamination due to stresses which occur during the connection of the registering terminal elements is inhibited.

Other objects and advantages of the invention will become apparent from the following description taken in conjunction with the accompanying drawings in which:

FIG. 3 is a fragmentary diagrammatic representation, on a greatly enlarged scale, of portions of the laminated bus structure with the proportions of certain of the parts distorted for purposes of clarity;

FIG. 5 is a vertical section of another embodiment of the invention; and

A switchgear structure as employed in a substation includes a plurality of vertical sections each of which is subdivided into chambers. Circuit breakers, and like control devices, are mounted on carriages received in the chambers. The vertical sections are placed side by side. Each vertical section normally has a common bus structure extending the full height of the section. The common bus structure is used to energize the devices within each chamber of that section. Means are also provided, within each chamber, for connecting the device within to the connected load. Cross bussing between the sections is provided connecting the vertical sections to a source of power.

Figure 1:
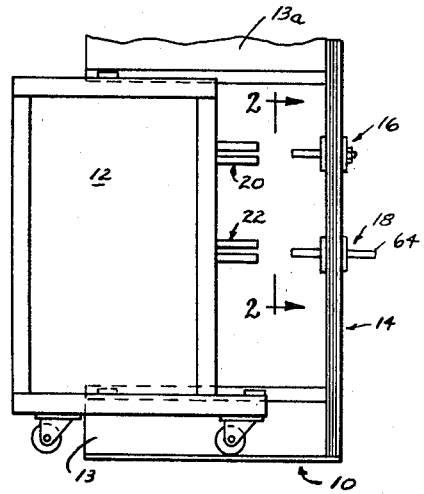
FIG. 1 is a side elevation of a mobile switching device and a portion of a vertical switchgear section, shown in vertical section, with the carriage partially positioned in and aligned within a chamber of the vertical section and with some parts omitted in the interest of clarity.
Figure 2:
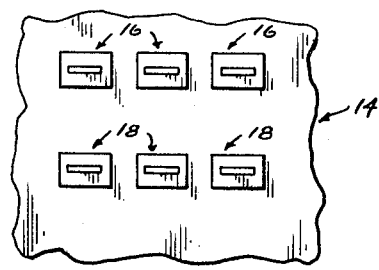
FIG. 2 is a front elevation of a portion of the laminated bus assembly viewed in the direction of the arrows 2—2 in FIG. 1.
Figure 4:
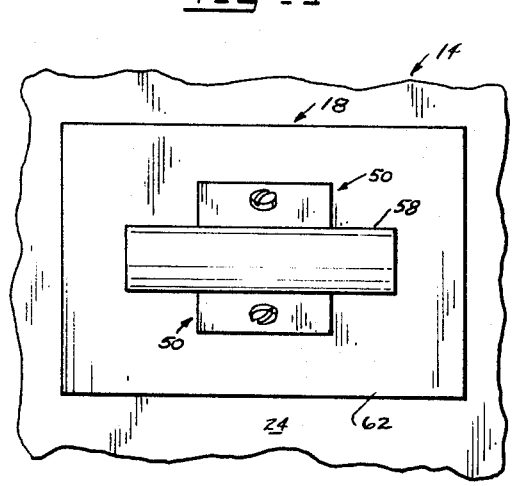
FIG. 4 is a front elevation of a terminal, on a reduced scale, of FIG. 3 viewed in the direction of the arrows 4—4 therein.

Referring to the drawings, there is illustrated in FIG. 1 drawout switchgear comprising a portion of a vertical section 10 and a mobile switching device 12. The device 12 may consist of a circuit breaker mounted on a carriage that is received within a chamber 13. Although only one chamber 13 and a portion of a second chamber 13a are illustrated it will be understood that the vertical section 10 can include additional chambers. The rear wall of the vertical section 10 is a three phase laminated bus assembly 14 that extends from one chamber to another forming the rear wall of the section. A typical vertical section 90" high would have a laminated bus assembly of approximately the same length. The bus assembly or stack 14 is provided with line and load terminals 16 and 18, respectively, in each chamber 13 for engagement with the registering terminals 20, 22 of the mobile switching device 12. It is contemplated that the mobile switching device 12 can include a carriage mounted circuit breaker of the type shown and described in U.S. Patent No. 3,097,275 which is assigned to the assignee of the present invention. Such circuit breakers have current ratings of 600 to 4000 amps. The carriage itself is shown and described in U.S. Patent No. 2,762,878 which is assigned to the assignee of the present invention. Further details of the mobile carriage and the circuit breaker carried thereby are not necessary to the understanding of the present invention and therefore are omitted in the interest of brevity.

Referring to FIG. 3 a portion of a three-phase laminated bus assembly 14 is shown which includes a plurality of sheets of insulation 24, 26, 28, 30 between which are interleaved sheets or layers 32, 34, 36 of conductor material that may conveniently be formed of thin copper. In the example shown, which is intended for use at 3000 amps., 600 volts A.C., the width of the stack is approximately 24". The thickness of the conductor layers is $\frac{1}{16}$" while the thickness of the insulating sheets is $\frac{3}{32}$". The overall thickness of the stack is approximately $1\frac{9}{32}$". The sheets and layers are secured to one another by suitable adhesive means to form the laminated stack 14. The connections to the various conductive layers within the bus 14 are made by means of the line terminals 16 (a form of connection to the inner layer being shown in FIG. 3 and another form of connection to one of the outer layers being shown in FIG. 5). Other terminals, not shown, are used to connect the conductor layers to a source of power. The line terminals 16 of FIG. 3 include a stem portion 38 projecting from the stack 14 into the chamber 13. In the three phase laminated bus assembly each of the line terminals 16 is connected to a respective one of the conductor layers 32, 34, 36 with the lengths of the various stems adjusted so that the terminal ends within the chamber lie in a common plane. Each terminal 16 also includes a stud 40 which extends toward the right as viewed in FIGS. 1 and 3.

It will be recognized that when the laminations are assembled it will be necessary that all of the terminal stems 38 pass through holes in one outer sheet 24 of insulation while all the terminal studs 40 pass through holes in the other outer sheet 30. Similarly, all the stems excepting those secured to the conductive layer 32 adjacent the first mentioned outer sheet 24 will have to extend through this conductive layer and the intervening sheets of insulation 26, 28 and so on. The studs 40 extend through the intervening sheets and layers to the reverse face of the stack. Each sheet and layer is formed with apertures arranged in a predetermined pattern to receive the stems 38 and studs 40. The apertures in the conductive layers are of a larger diameter than those formed in the insulating sheets and each contains a flat filler member or washer 42 of the insulating material. For purposes of manufacturing convenience the apertures may be made the same size, the studs which are of smaller diameter being spaced inwardly from the innermost edges thereof. The studs 40 are threaded into the respective stems 38 through the conductive sheet to which the stem is connected, as by brazing, and extend beyond the rear outer sheet 30 of insulation. A first clamping member 44 which may be either of conductive material, or insulating material of sufficient stiffness for the intended purpose, is positioned on the stud 40 between a nut 46 and the outer sheet 30 of insulation. A corresponding cooperating clamp member 48 is positioned about the stem 38 and is driven against the front outer sheet of insulation 24 by screw operated wedges 50. The wedges 50 include a plate 52 pivoted in a notch 54 in the stem 38 and an operating screw 56. The clamp members 46 and 48 overlie the inner sheets and layers so that when drawn tight by nut 46 and wedges 50 all of the intervening members making up the stack are clamped together tightly. The contacts 20 of the switching device 12 are strongly spring loaded to provide good contact pressure between the contacts and the terminals 16 of the bus assembly. The laminated bus must hold the terminals firmly in place while the contacts are driven home, the reaction point for the driving forces being the terminals. This concentrated force loading tends to delaminate the bus. By unifying the layers and sheets at the point of application of the delaminating stress the force is more uniformly distributed and most importantly relative movement of the sheets and layers is prevented. Without the provision of the clamp 44, 48 the push-on force must be resisted solely by the insulating sheets and conductor layers behind the layer to which the stem 38 is brazed. There is a tendency for the conductive layer, in this case layer 34, to be separated from the next preceding sheet of insulation 26. When the switch terminal 20 is to be disconnected from terminal 16 the pull-off force must be resisted solely by the insulating sheets and conductor layers between the layer to which the stem is connected and the terminal and there is a tendency for the conductive sheet 34 to pull away from the insulating sheet 28 behind it. When the stem is connected to either of the outer sheets 32 or 36 the tendency to delaminate is emphasized when the direction of force application is away from the stack and the advantages of the novel construction will be more fully appreciated.

The switch device load terminal 22 (not shown in detail) is identical to the line terminal 20 illustrated in FIG. 3. Terminal 22 connects with terminal 18 which includes a stem 58 that passes through but is insulated from the bus assembly. Wedges 50 operate a pair of clamp members 60 and 62 to secure the terminal 18 to the laminated bus 14. Any connection stresses are distributed over the stack. The stem portion 64 at the rear of the stack (FIG. 1) provides a connection point for the cables or the like leading to the connected load. The terminals 18 are entirely supported by the laminated bus 14 providing a greatly simplified construction.

Figure 6:
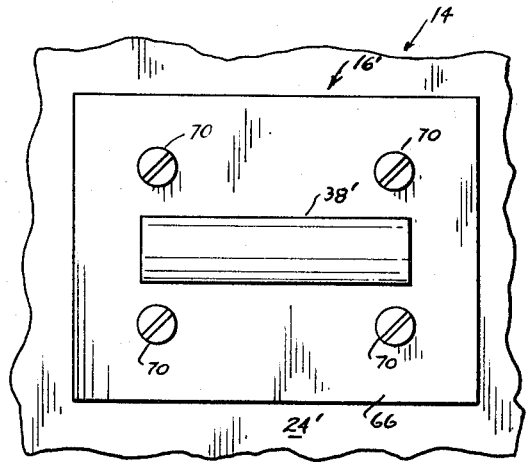
FIG. 6 is a front elevation of the embodiment of FIG. 5 as viewed in the direction of the arrows 6—6 thereof.

Referring to FIGS. 5 and 6 another form of the bus line terminal 16' is illustrated. The terminal stem 38' is connected as before to one of the conductor sheets 32'. In this embodiment the front and rear clamp members 66 and 68 are drawn together by screws 70 which pass through appropriate apertures in the intervening insulation sheets 24', 26', 28', 30', and conductor layers 32', 34', 36'. Insulating members 72 of the same material are positioned in apertures in the conductive sheets 34', 36' of the other phases through which the clamp screws 70 pass. Jam nuts 74 are provided to lock the screws 70. As in the embodiment of FIG. 3 the stresses due to connection and disconnection of the switching device are resisted by the entire laminated bus assembly 14.

The delamination of the sheets and layers is prevented by means which secures the lamina together to thereby resist the movement of the terminal elements and the associated conductor layer with respect to the laminated bus. As an alternative to the screw wedges 50 and nut 46 of the embodiment of FIG. 1, the terminal 16 and conductor layer 34 may be restrained against movement relative to the stack by the application of well-known epoxy cements between the terminal elements 38 and the stud 40 and the laminated bus asembly. In this embodiment the clamp members 44 and 48 may be omitted since the connection stresses to be resisted would be distributed over the area of adhesion of the epoxy cement rather than concentrated as in the case of the wedges 50.

While several embodiments of the invention have been shown and described those skilled in the art will appreciate that changes and modifications may be made herein without departing from the spirit and scope of the invention.

What I claim is:

1. Drawout switchgear comprising a chamber and a mobile switching device having registering terminal elements, said chamber including a laminated bus assembly as its back wall, said laminated bus assembly comprising a plurality of interleaved sheets of insulation and sheets of conductor material bonded together into a laminated stack, corresponding bus terminal elements mechanically and electrically connected to one of said sheets of conductor material for connection with said terminal elements of said mobile switching device, and means fixing said bus terminal elements in place relative to said laminated bus assembly to inhibit delamination thereof by stresses occurring during the connection of said registering terminal elements therewith.

2. Drawout switchgear according to claim 1 wherein said laminated bus assembly has a plurality of said bus terminal elements, each of said bus terminal elements being mechanically and electrically connected to respective ones of said sheets of conductor material and extending through appropriate apertures in the intervening sheets to one side of said laminated bus assembly for engagement by said terminal elements of said mobile switching device.

3. Drawout switchgear according to claim 2 wherein said means for inhibiting delamination includes means cooperating with said extending bus terminal elements for securing together said intervening sheets.

4. Drawout switchgear according to claim 2 wherein said bus terminal elements each have a rearwardly extending portion which extends in the opposite direction to the other side of said laminated bus assembly through appropriate apertures in the intervening sheets, and wherein said means for inhibiting delamination includes means cooperating with said rearwardly extending portion for securing together said intervening sheets.

5. Drawout switchgear according to claim 2 wherein said means for inhibiting delamination includes clamping members disposed on opposite sides of said laminated stack adjacent said bus terminal elements and insulated means extending through said stack for operating said clamping members to clamp together said laminated bus assembly.

6. Drawout switchgear according to claim 1 wherein said laminated bus assembly has a plurality of bus terminal elements, each of said bus terminal elements being mechanically and electrically connected to respective ones of said sheets of conductor material and extending through appropriate apertures in the intervening sheets to one side of said laminated bus assembly for engagement by said terminal elements of said mobile switching device, each of said bus terminal elements having a rearwardly extending portion which extends in the opposite direction to the other side of said laminated bus assembly through appropriate apertures in the intervening sheets, and wherein said means for inhibiting delamination includes means cooperating with said bus terminal elements and means cooperating with said rearwardly extending portion for securing together the intervening sheets from opposite sides of the stack.

7. Drawout switchgear according to claim 6 wherein said means for inhibiting delamination includes a clamp member and a wedge type operator therefor, said wedge type operator reacting between said bus terminal element and said clamp member.

8. Drawout switchgear according to claim 6 wherein said means for inhibiting delamination includes a layer of epoxy cement between said bus terminal element, said rearwardly extending portion and said laminated stack.

9. Drawout switchgear comprising a chamber and a mobile switching device having registering terminal elements, said chamber including a laminated bus assembly as its back wall, said laminated bus assembly comprising a plurality of interleaved sheets of insulation and sheets of conductor material bonded together into a laminated stack, corresponding feed-through terminal elements mechanically secured to and passing through but electrically insulated from said laminated stack, means fixing said feed through terminal elements in place relative to said laminated bus assembly to inhibit delamination thereof by stresses occurring during the connection of said registering terminals therewith, said fixing means including clamp members operatively connected to said bus terminal element on opposite sides of said stack, and means for operating said clamp members reacting between said clamp members and said feed-through terminal elements.

10. A laminated bus assembly comprising a plurality of interleaved sheets of insulation and sheets of conductor material adhesively bonded together into a laminated stack, bus terminal elements mechanically and electrically connected to one of said sheets of conductor material for connection with terminal elements of a switching device to be connected thereto, and means fixing said bus terminal elements in place relative to said laminated bus assembly to inhibit delamination thereof by stresses occurring during the connection of a switching device therewith.

11. A laminated bus assembly according to claim 10 wherein said laminated bus assembly has a plurality of said bus terminal elements, each of said bus terminal elements being mechanically and electrically connected to respective ones of said sheets of conductor material and extending through appropriate apertures in the intervening sheets to one side of said laminated bus assembly for engagement by the terminal elements of a switching device.

12. A laminated bus assembly according to claim 11 wherein said means for inhibiting delamination includes means cooperating with said extending bus terminal elements for securing together said intervening sheets.

13. A laminated bus assembly according to claim 11 wherein said bus terminal elements each have a rearwardly extending portion which extends from the opposite direction to the other side of said laminated bus assembly through appropriate apertures in the intervening sheets, and wherein said means for inhibting delamination includes means cooperating with said rearwardly extending portion for securing together said intervening sheets.

14. A laminated bus assembly according to claim 10 wherein said laminated bus assembly has a plurality of bus terminal elements, each of said bus terminal elements being mechanically and electrically connected to respective ones of said sheets of conductor material and extending through appropriate apertures in the intervening sheets to one side of said laminated bus assembly for engagement by terminal elements of a switching device, each of said bus terminals having a rearwardly extending portion which extends in the opposite direction to the other side of said laminated bus assembly through appropriate apertures in the intervening sheets, and wherein said means for inhibiting delamination includes means cooperating with said bus terminal elements and means cooperating with said rearwardly extending portion for securing together the intervening sheets from opposite sides of the stack.

15. A laminated bus assembly according to claim 14 wherein said means for inhibiting delamination includes a clamp member and a wedge type operator therefor, said wedge type operator reacting between said bus terminal and said clamp member.

16. A laminated bus according to claim 14 wherein said means for inhibiting delamination includes a layer of epoxy cement between said bus terminal element, said rearwardly extending portion and said laminated stack.

17. A laminated bus assembly according to claim 11 wherein said means for inhibiting delamination includes clamping members disposed on opposite faces of said laminated stack adjacent said bus terminal elements and insulated means extending through said stack for operating said clamp members to clamp together said laminated bus assembly.

18. A laminated bus assembly comprising a plurality of interleaved sheets of insulation and sheets of conductor material bonded together into a laminated stack, corresponding feed-through terminal elements mechanically secured to and passing through but electrically insulated from said laminated stack, means fixing said feed-through terminal elements in place relative to said laminated bus assembly to inhibit delamination thereof by stresses occurring during the connection of a switching device therewith, said fixing means including clamp members operatively connected to said bus terminal element on opposite sides of said stack and means for operating said clamp members reacting between said clamp members and said feed-through terminal elements.

References Cited

UNITED STATES PATENTS

| | | | |
|---|---|---|---|
| 2,129,723 | 9/1938 | Wood | 200—50.15 |
| 3,151,278 | 9/1964 | Elarde | 174—68.5 XR |
| 3,178,668 | 4/1965 | Weimer et al. | 339—22 |

ROBERT K. SCHAEFER, *Primary Examiner.*

M. GINSBURG, *Assistant Examiner.*